(12) United States Patent
Ghaisas et al.

(10) Patent No.: US 7,634,549 B1
(45) Date of Patent: Dec. 15, 2009

(54) AUTOMATED WEBSITE UPDATE METHOD AND SYSTEM

(75) Inventors: Devika S. Ghaisas, Redmond, WA (US); Dean R. O'Neill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 10/464,714

(22) Filed: Jun. 19, 2003

(51) Int. Cl.
*G06F 15/177* (2006.01)
(52) U.S. Cl. .................................................. 709/220
(58) Field of Classification Search ................ 709/201, 709/204, 220
See application file for complete search history.

(56) References Cited

U.S. PATENT DOCUMENTS

| | | | |
|---|---|---|---|
| 5,511,164 A * | 4/1996 | Brunmeier et al. ............ | 714/53 |
| 6,012,066 A * | 1/2000 | Discount et al. ........ | 707/103 R |
| 6,308,188 B1 * | 10/2001 | Bernardo et al. ............ | 715/234 |
| 2001/0039594 A1 * | 11/2001 | Park et al. .................... | 709/311 |
| 2004/0122843 A1 * | 6/2004 | Terris et al. .................. | 707/102 |

FOREIGN PATENT DOCUMENTS

EP      1168193 A1 *  1/2002

* cited by examiner

*Primary Examiner*—Andrew Caldwell
*Assistant Examiner*—Bradford F Fritz
(74) *Attorney, Agent, or Firm*—Merchant & Gould P.C.

(57) ABSTRACT

Methods and systems are provided for automating updates to and maintenance of live Internet sites. An Internet-based tool is provided including a series of Internet-based web pages for communicating proposed updates to a live website and for approving, testing and implementing proposed updates. The automated website updating tool allows for passing a proposed modification or update through a quality control process and ultimately updating the live website.

19 Claims, 12 Drawing Sheets

Building

Fig. 4

Pre-Production Triage

*Fig. 5*

Propping (Pre)

*Fig. 6*

Testing (Pre)

Propping (Live)

Fig. 9

Testing (Live)

AUTOMATED WEBSITE UPDATE METHOD AND SYSTEM

FIELD OF THE INVENTION

The present invention relates to an automated method and system for updating or repairing a live Internet website.

BACKGROUND OF THE INVENTION

Among the most useful developments in modern times is the Internet where websites may be published for consumption by a variety of users. With such sites, vast amounts of useful information may be made available and a variety of interactive electronic communications functionality may be facilitated. Unfortunately, often errors (bugs) are discovered in published websites such as misspelled words, incorrect data, and the like. Additionally, system and functionality errors that adversely affect the operation of the site or the functionality offered by the site may be discovered. Often, site or software developers wish to add an update to the site not associated with a site problem or error, but for the purpose of adding new site presentation information or functionality, or for enhancing existing presentation data or functionality. Unfortunately, a manual site update process whereby a site update is proposed, built and implemented often leads to quality control problems and inefficiency where the update is not adequately tested and approved prior to implementing. Also, such manual updating processes often lead to inconsistency in site maintenance across different published sites.

Accordingly, there is a need for a method and system for automating updates to and maintenance of live Internet sites that allows for efficient, consistent and reliable modification and update of live Internet sites. It is with respect to these and other considerations that the present invention has been made.

SUMMARY OF THE INVENTION

Embodiments of the present invention provide methods and systems for automating updates to and maintenance of live Internet sites. An Internet-based tool is provided including a series of Internet-based web pages for communicating proposed updates to a live website and for approving, testing and implementing proposed updates. The automated website updating tool allows for passing a proposed modification or update through a quality control process and ultimately updating the live website.

After the discovery of a website problem, such as a presentation error or functional error, or when a site update is desired, a developer launches a first automated site update web page. The developer proposes a correction for the problem or a desired site update. Upon submission of the proposed update, information provided by the developer is transmitted electronically to a triage team who may review the proposed update. Alternatively, the proposed update may be built by the developer and transmitted to the triage team before first describing the update to the triage team. If the triage team finds the update acceptable, the triage team makes an automated approval selection. Upon approval selection by the triage team, the update is automatically uploaded to a mirror site of the live site for which the update is intended. When the update is uploaded to the mirror site, a notification is automatically sent to a tester for testing the updated mirror site. If the test is not successful, the developers of the update are automatically notified, and a modification to the update may be created and further tested.

If the test of the mirror site is successful, a second review by the triage team may be performed. If the triage team finds the tested update acceptable, the update is automatically uploaded to the live website. After the update is uploaded to the live site, a notification is sent to the tester to test the update on the live site. If the test of the updated live site is successful, the automated update process is closed. If the test of the updated live site is not successful, the developer may be automatically notified to modify the proposed update.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 5 is a computer screen display showing an illustrative Internet-based web page submitted to a triage team for reviewing and approving a proposed website update according to an embodiment of the present invention.

DETAILED DESCRIPTION OF THE PREFERRED EMBODIMENT

As described briefly above, embodiments of the present invention are directed to methods and systems for automating updates to and maintenance of a live Internet website. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is, therefore, not to be taken in a limiting sense and a scope of the present invention is defined by the appended claims and their equivalents.

Figure 1:
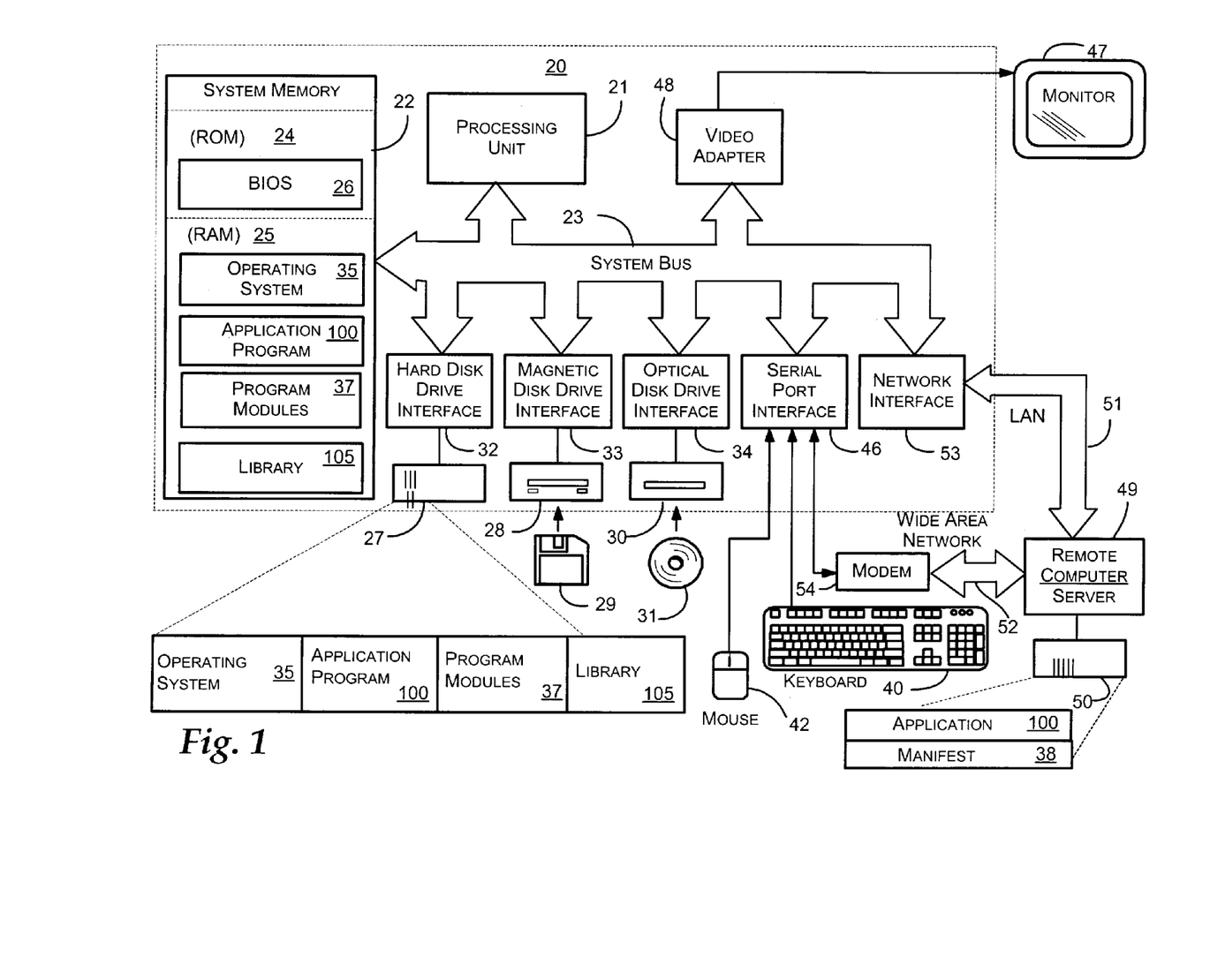
FIG. 1 is a block diagram showing the architecture of a personal computer that provides an illustrative operating environment for embodiments of the present invention.

Referring now to the drawings in which like numerals represent like elements throughout the several figures, aspects of the present invention and the exemplary operating environment will be described. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
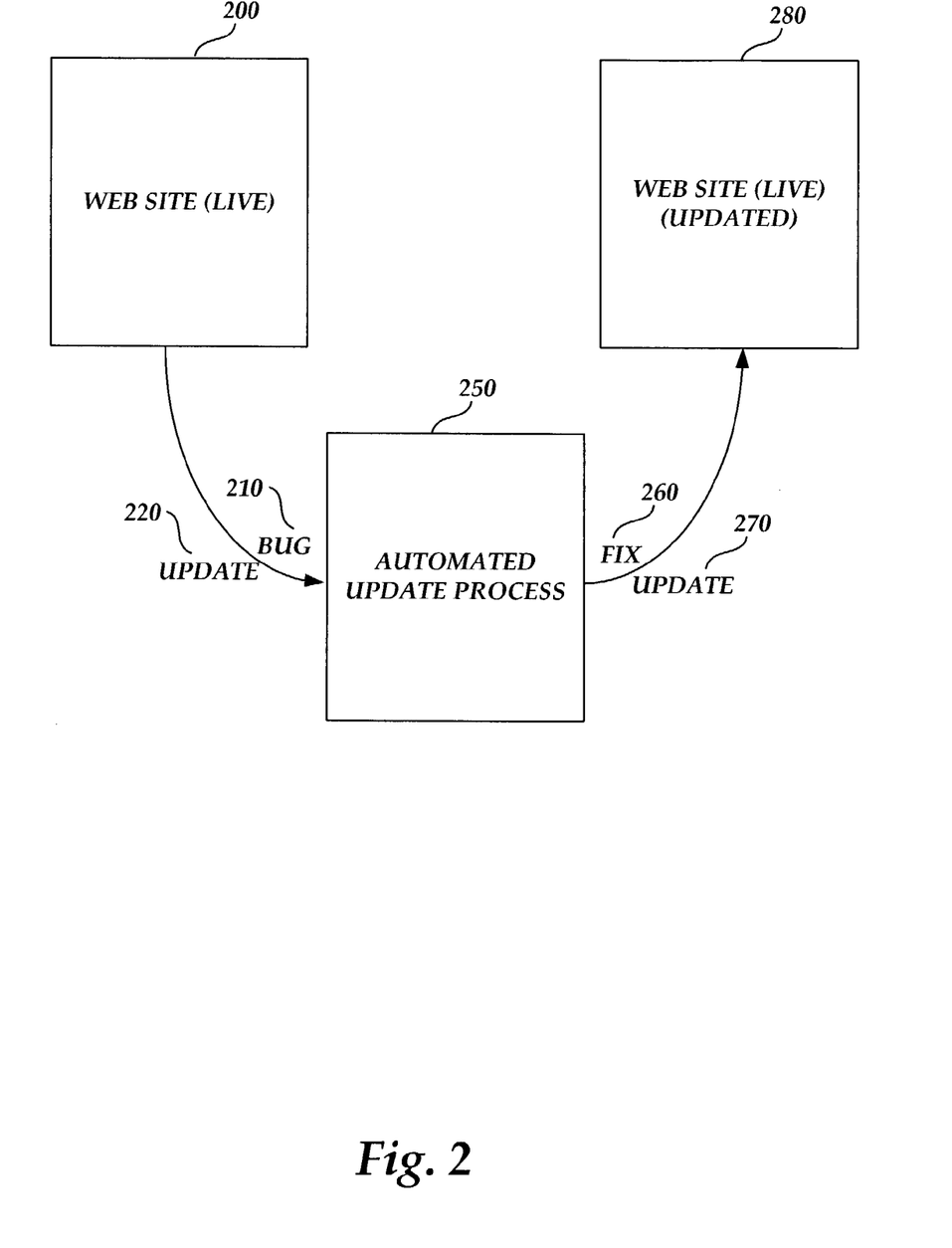
FIG. 2 is a simplified block diagram showing interaction of an automated website update process with a live website.

FIG. 2 is a simplified block diagram showing interaction of an automated website update process according to embodiments of the present invention with a live website. The automated update process 250 is a computer software application having sufficient computer executable instructions for automating updates to and maintenance of live Internet sites. According to an embodiment of the present invention, when errors or bugs are discovered in a live website 200 or when a developer or contributor to presentation or functionality of the live website 200 develops a useful update for the website 200, the bug 200 or update 220 is proposed, developed, approved, tested, launched for consumption and is retested via the automated update process 250 so that the fix 200 or approved update 270 may be populated onto an updated live website 280. As is described in detail below, the automated update process 250 includes a tool allowing various participants in the site update process including developers, testers, project managers, and the like to automatically be notified of an error or bug 210 and a proposed update 220 and to automatically review the proposed update and forward the proposed update to the next participant in the process so that the proposed update may ultimately be populated onto the updated live website 280.

Figure 3:
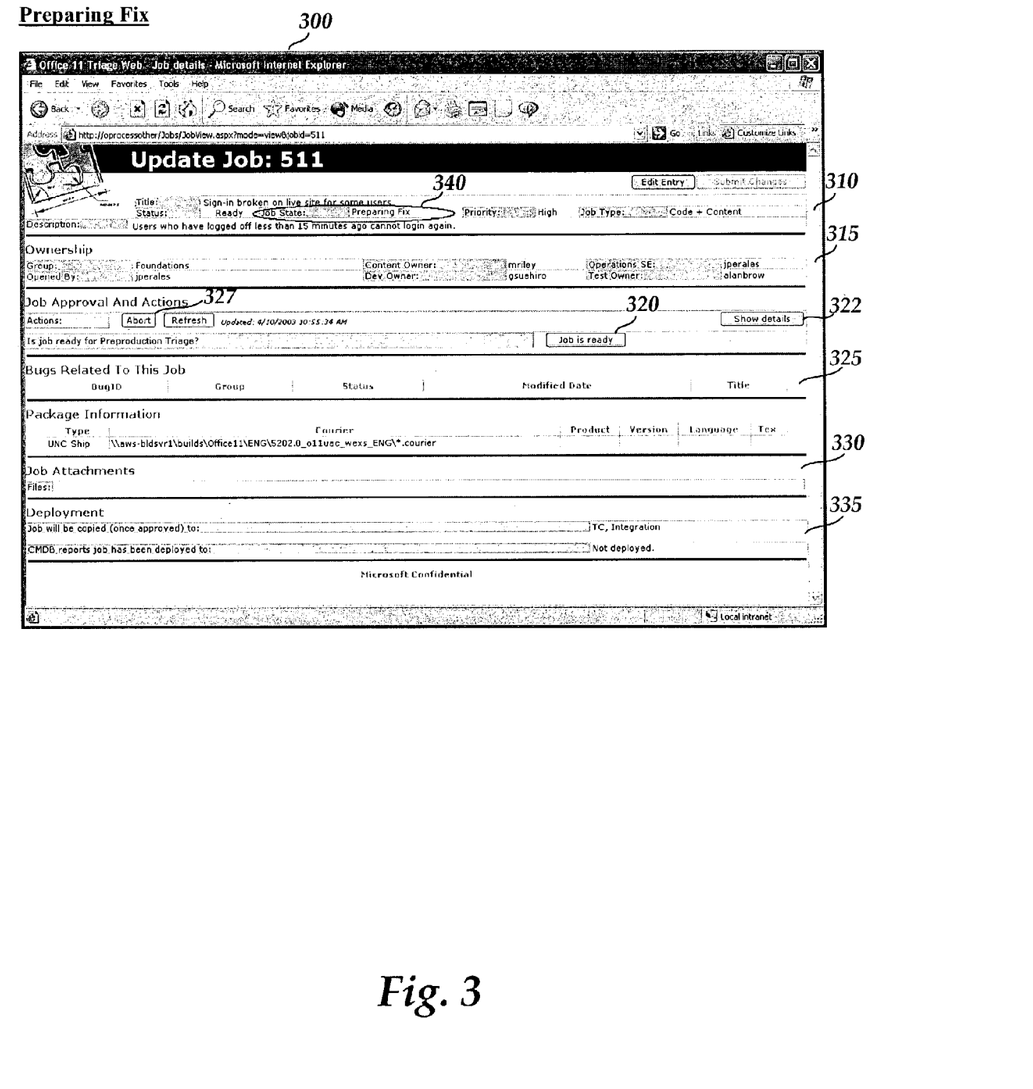
FIG. 3 is a computer screen display showing an illustrative Internet-based web page utilized by a developer for preparing and submitting a proposed website update according to an embodiment of the present invention.

FIG. 3 is a computer screen display showing an illustrative Internet-based web page utilized by a developer for preparing and submitting a proposed website update according to an embodiment of the present invention. The developer who has been tasked with repairing an error or bug or who has developed an improvement to a live website opens the web page 300 and completes the update job page in order to begin the process of updating a live website. The developer may use various fields on the website update automation web page 300, (hereafter web page 300) including the field 310 in which the developer may include a title of the update job, a status of the update job and a brief description of the update. In the job approval and actions field, the developer may submit the job to the next participant in the update process by selecting the "job is ready" button 320. The developer and other participants may review details of the update job by selecting the "show details" button 322. Other fields include the field 325 in which the developer may enter bugs or errors related to the proposed update job and the field 330 where the developer may attach computer-readable and computer-executable files associated with the update job including a patch or fix that will ultimately be used to prepare an error in the live site or provide an improvement to the live site. A deployment field 335 allows the developer and other participants to enter and review information regarding the deployment of the proposed update.

Figure 4:
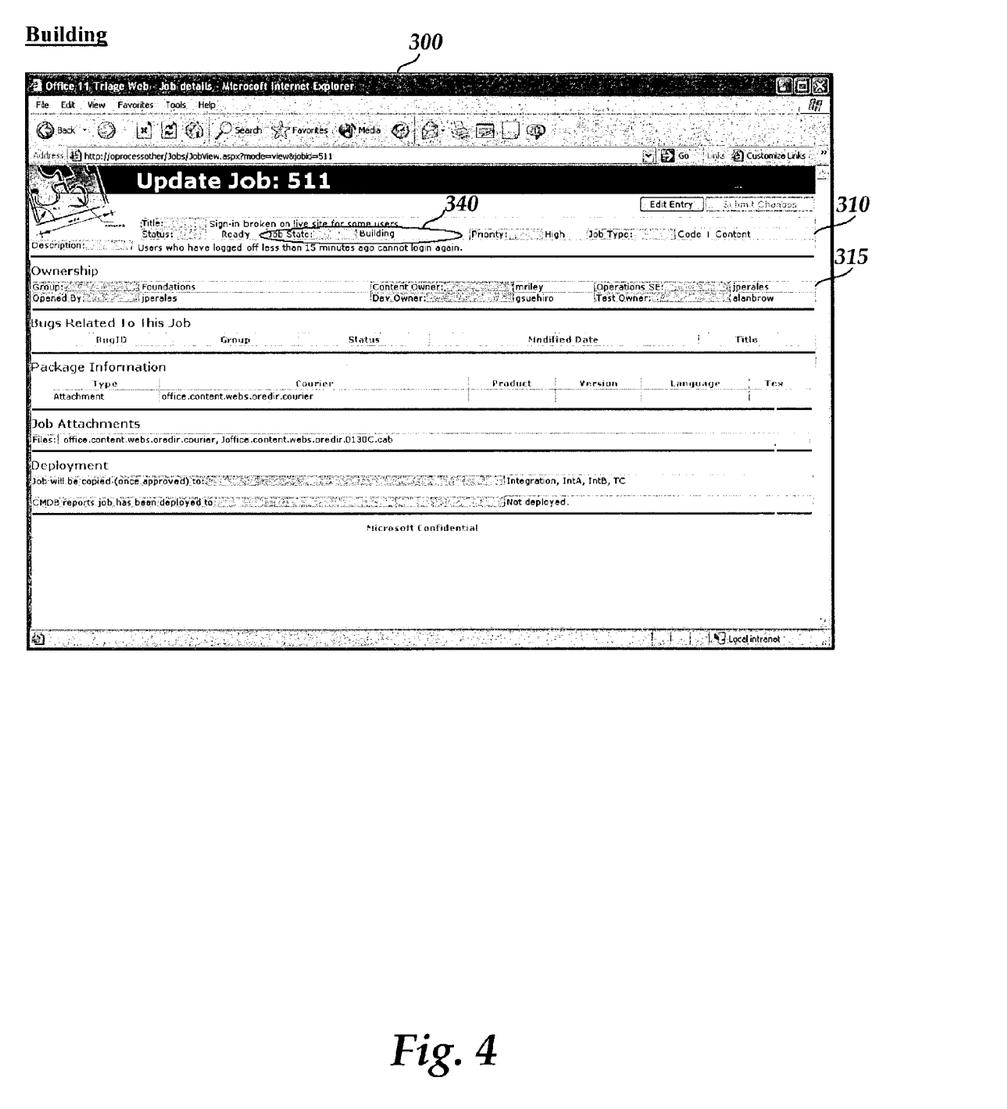
FIG. 4 is a computer screen display showing an illustrative Internet-based web page showing that a proposed update is being built according to an embodiment of the present invention.

FIG. 4 is a computer screen display showing an illustrative Internet-based web page showing that a proposed update is being built according to an embodiment of the present invention. The web page 300 illustrated in FIG. 4 shows a job state 340 where the job state has been changed from "preparing a fix or update" to "building" illustrating to participants in the update process who may open the web page 300 that the update job is being built by the developer according to the proposed update. The ownership field 315 shows individuals and groups who have responsibility for and association with the live website and the update being built for deployment to the live website.

FIG. 5 is a computer screen display showing an illustrative Internet-based web page submitted to a triage team for reviewing and approving a proposed website update according to an embodiment of the present invention. Once the proposed update has been built, the proposed update is automatically forwarded to a triage team made up of various members including developers, testers, project managers, and the like who are responsible for reviewing the proposed and built update and for allowing the process to proceed to testing. It should be appreciated that the triage team may be utilized to approve the proposed update prior to actually building the update to prevent the needless building of the update if the triage team ultimately decides that the update is not necessary or is otherwise not approved. Once the update is built or the proposed update is forwarded to the triage team, the web page 300 is shown having a job status of "triage (pre)" illustrating that the triage team is ready to review the proposed or built update prior to testing the proposed update. As shown in the job approval and actions field, once the proposed update is forwarded to the triage team, a "triage approves" button 350 is populated into the web page 300 to allow the triage team to approve or disapprove of the proposed or built website update. A "triage disapproves" button (not shown) may be used to disapprove the update. As should be understood, upon opening the web page 300 by the triage team, the triage team may open or launch the job attachments attached to the job attachments field of the web page 300 to review any presentation change or functionality change or improvement associated with the proposed or built update. If the triage team approves the proposed or built update, the triage team may select the "triage approves" button 350 to advance the update project to a testing phase.

Figure 6:
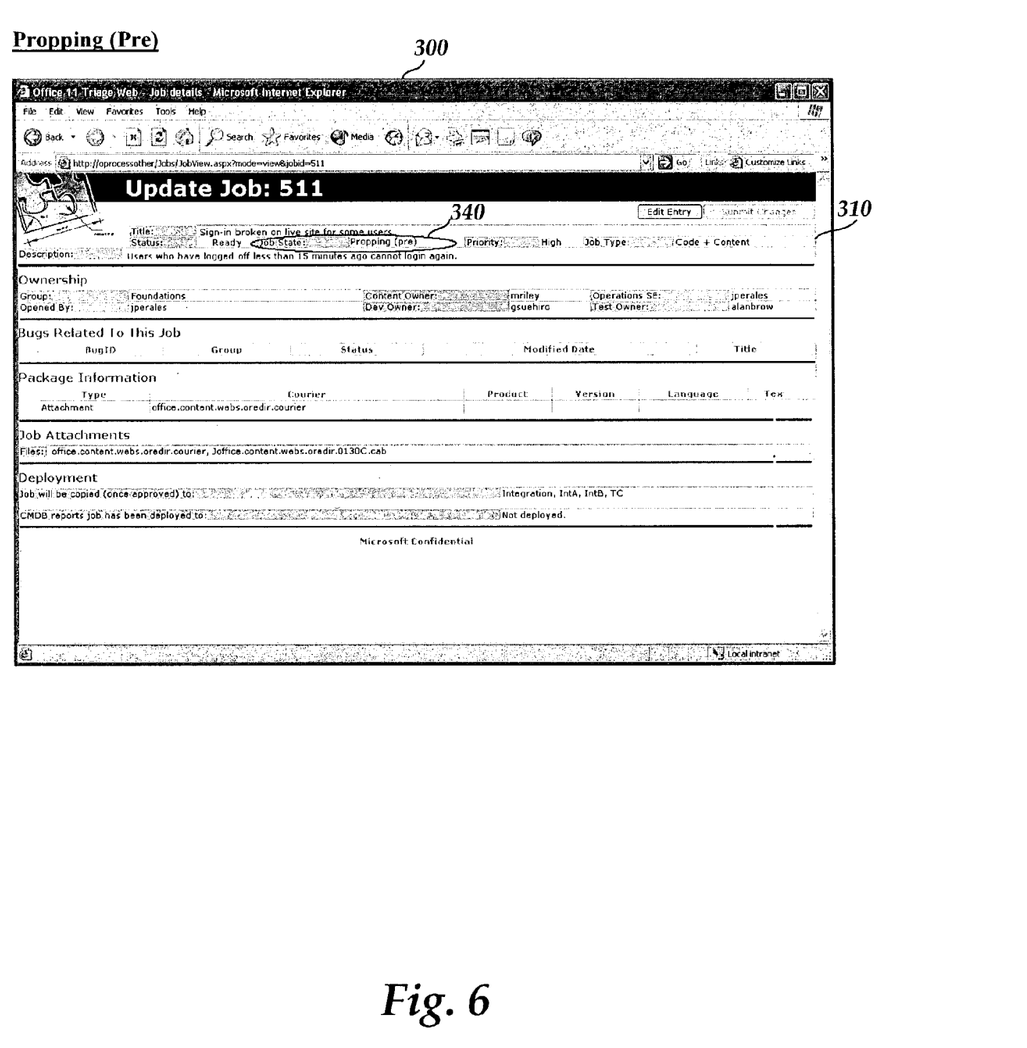
FIG. 6 is a computer screen display showing an illustrative Internet-based web page showing a job state associated with publishing a website update to a mirror website according to an embodiment of the present invention.

FIG. 6 is a computer screen display showing an illustrative Internet-based web page showing a job state associated with publishing a website update to a mirror website according to an embodiment of the present invention. Once the triage team approves the proposed or built update, the update if built is automatically populated to a non-live test website that is a mirror of the live website for purposes of testing the proposed update prior to launching the proposed update to the live website 280. As shown in FIG. 6, once the proposed update is automatically populated onto the test website, the job state 340 is changed to "propping (pre)" illustrating that the proposed update has been populated to or "propped" to the test mirror website for review by a tester or other reviewing participant in the project.

Figure 7:
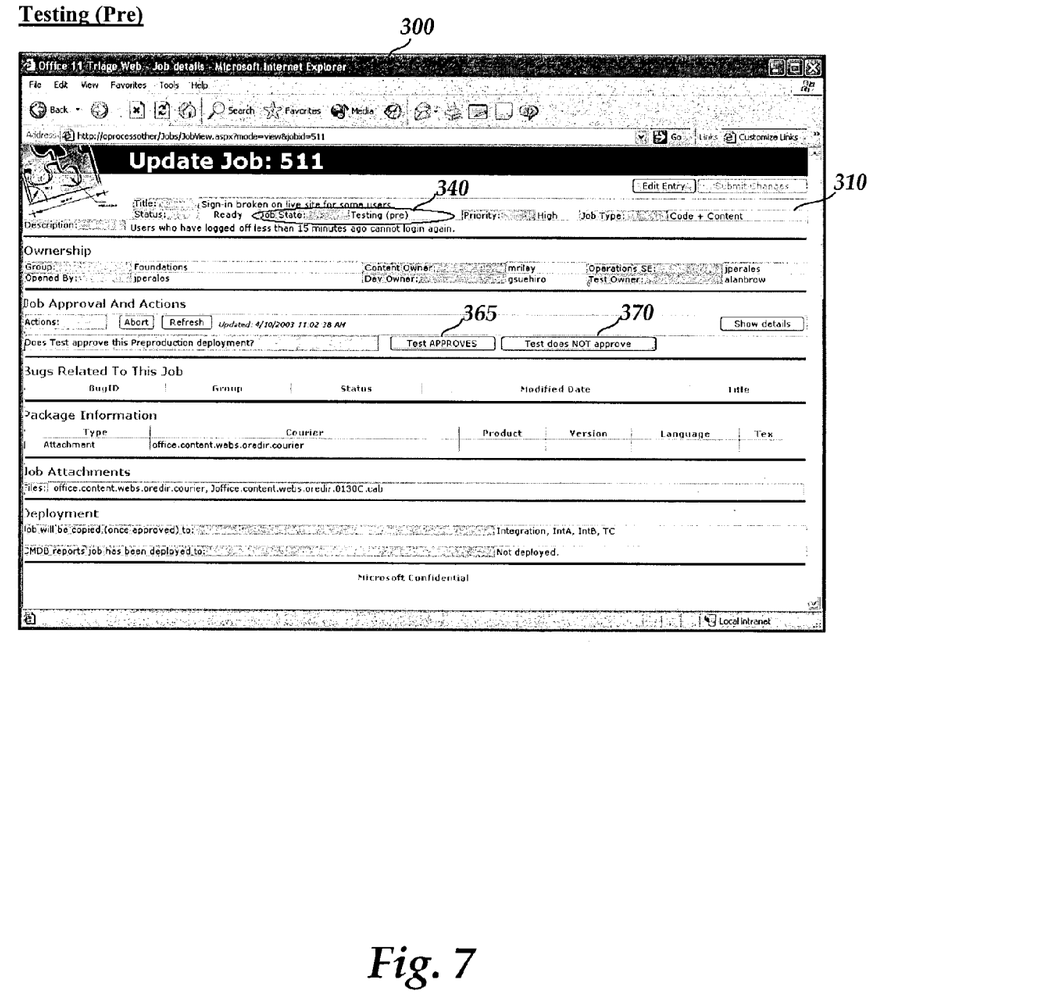
FIG. 7 is a computer screen display showing an illustrative Internet-based web page utilized by a tester of the website update for reviewing and approving the proposed website update according to an embodiment of the present invention.

FIG. 7 is a computer screen display showing an illustrative Internet-based web page utilized by a tester of the website update for reviewing and approving the proposed website update according to an embodiment of the present invention. Once the proposed update is populated onto the test mirror website, the job state 340 of the filed 310 changes to "testing (pre)" to indicate that the proposed update is in the testing phase prior to being populated onto the live website 280. In the job approval and actions field, a "test approved" button 365 and a "test does not approve" button 370 are populated onto the web page 300 to allow the tester to approve or disapprove of the proposed update deployed to the test site.

Figure 8:
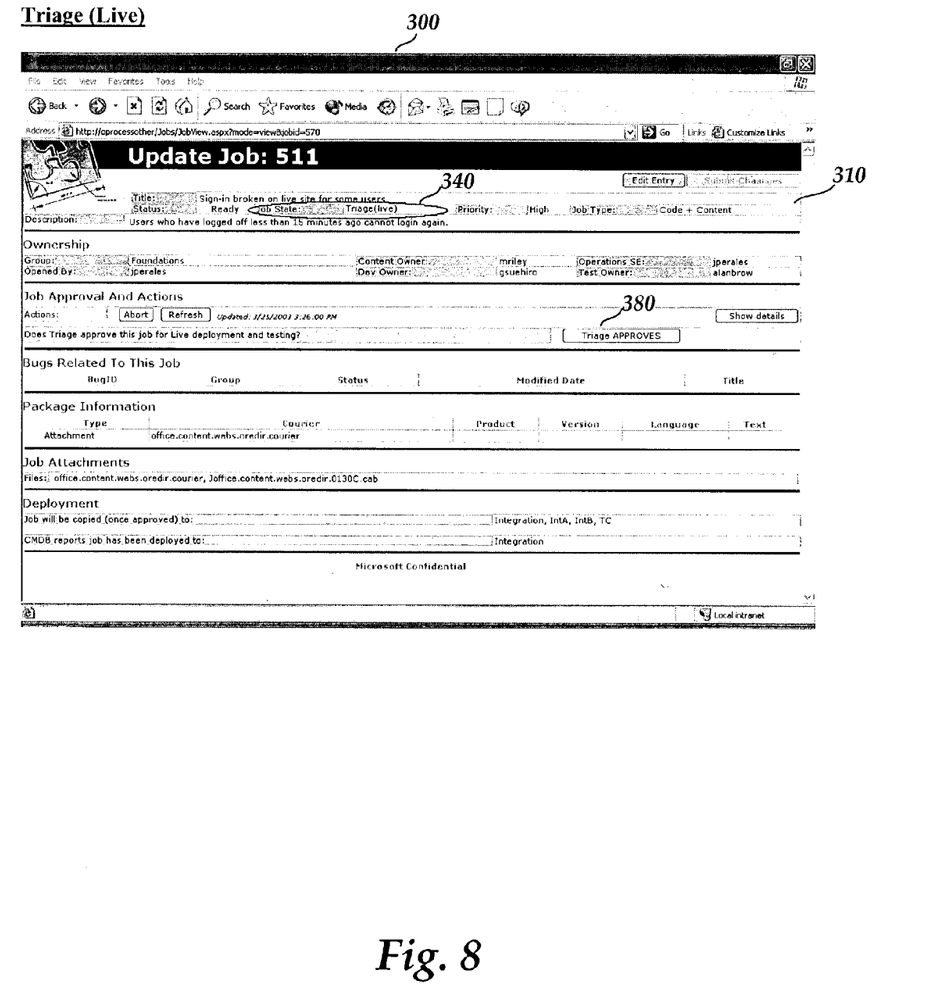
FIG. 8 is a computer screen display showing an illustrative Internet-based web page utilized by a triage team for reviewing and approving a tested update to a mirror website according to an embodiment of the present invention.

FIG. 8 is a computer screen display showing an illustrative Internet-based web page utilized by a triage team for reviewing and approving a tested update to a mirror website according to an embodiment of the present invention. If the tester selects the "test approves" button 365 of the web page 300, illustrated in FIG. 7, an electronic mail is transmitted to the triage team to allow the triage team to review and approve the update tested on the test mirror website. As shown in the field 310, the job state 340 is changed to "triage (live)" and a "triage approves" button 380 is populated into the job approval and actions field of the web page 300. If the triage team approves of the tested update on the mirror website, the triage team may select the "triage approves" button, and the tested update is automatically populated to the live website 280.

Figure 9:
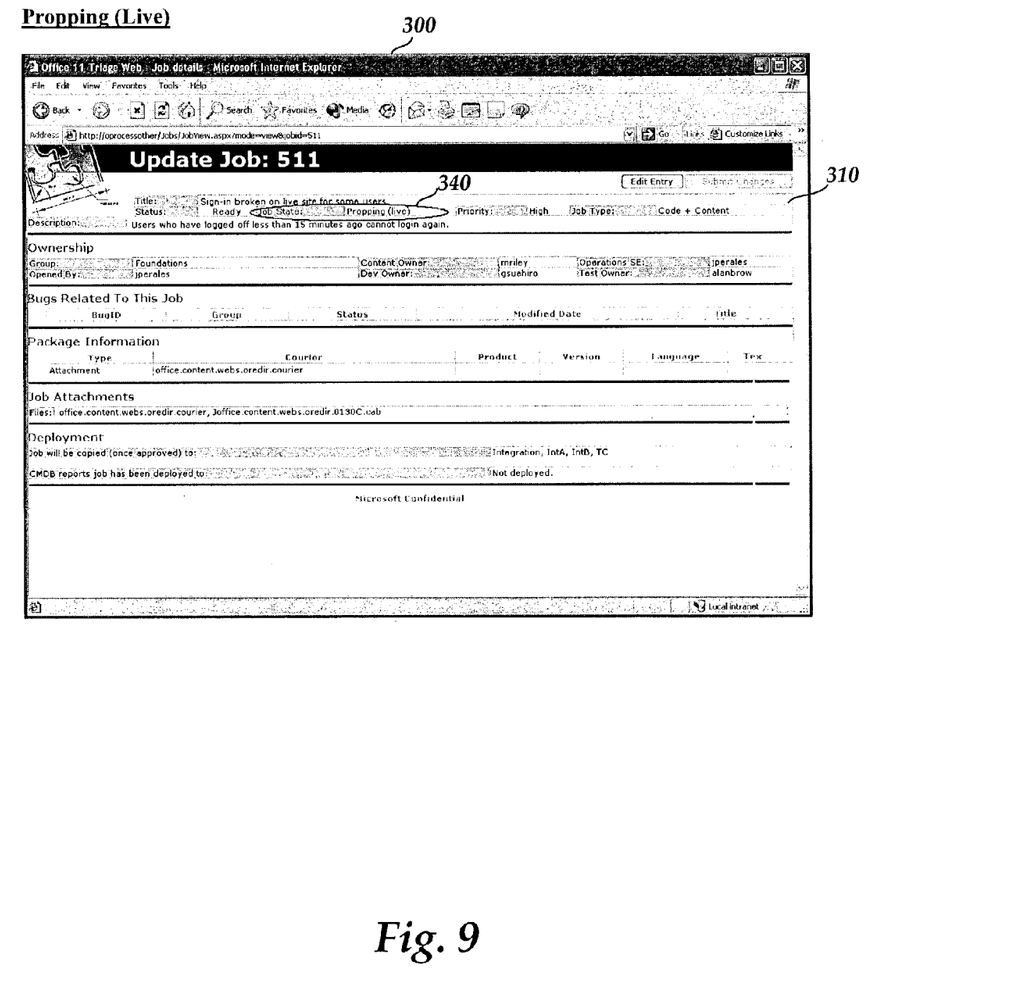
FIG. 9 is a computer screen display showing an illustrative Internet-based web page utilized for publishing a proposed website update to a live website according to an embodiment of the present invention.

FIG. 9 is a computer screen display showing an illustrative Internet-based web page utilized for publishing a proposed website update to a live website according to an embodiment of the present invention. As shown in FIG. 9, the job state 340 is changed to "propping (live)" to show that the current job state for the proposed update is that the proposed update has been published to the live website 280.

Figure 10:
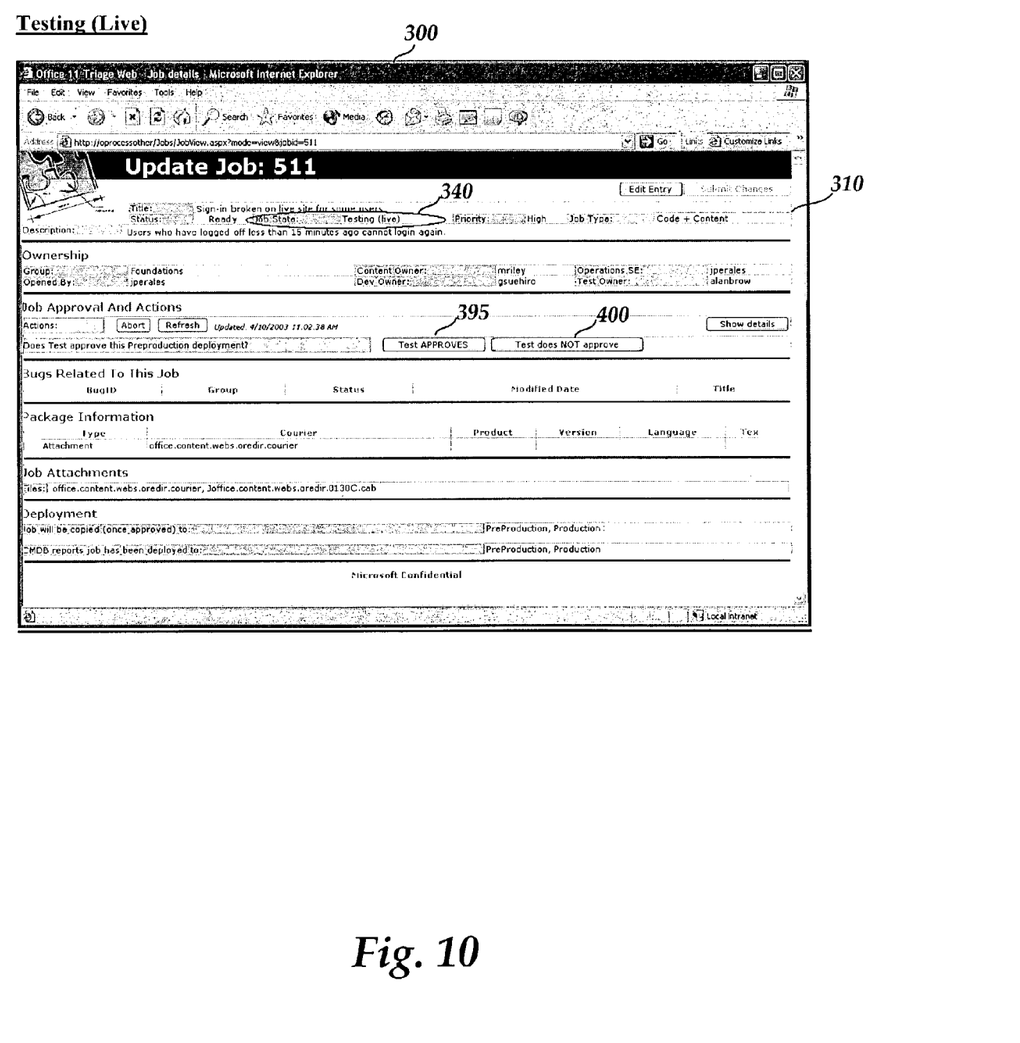
FIG. 10 is a computer screen display showing an illustrative Internet-based web page utilized by a tester of a website update published to a live website according to an embodiment of the present invention.

FIG. 10 is a computer screen display showing an illustrative Internet-based web page utilized by a tester of a website update after the update as been published to a live website. The job state has changed to "testing (live)" showing that the current status of the update job is that the update job is being tested on the live website. A "test approves" button 395 and a "test does not approve" button 400 is populated in the job approval and actions field to allow the tester to approve or disapprove of the update to the live website.

Figure 11:
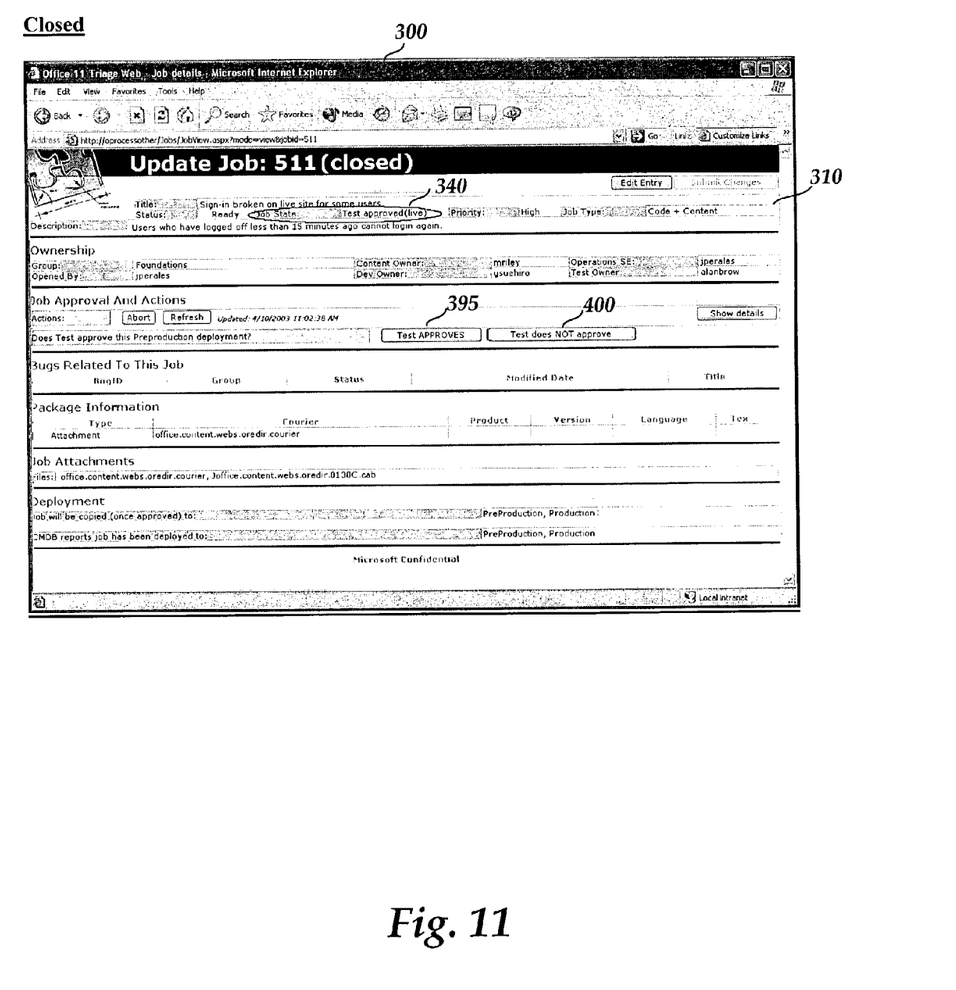
FIG. 11 is a computer screen display showing an illustrative Internet-based web page showing a job state associated with an approved update to a live website according to an embodiment of the present invention.

FIG. 11 is a computer screen display showing an illustrative Internet-based web page showing a job state associated with an approved update to a live website according to an embodiment of the present invention. If the tester approves of the update as populated onto the live website 280, the job state 340 changes to "test approved (live)." Accordingly, in accordance with embodiments of the present invention, a proposed update may advance from a proposal phase through a testing and approval phase on a live website through the use of electronic mail transmissions from one participant group to a subsequent participant group. After each participant group has concluded with its portion of the development, approval and testing process, an Internet-based web 300 is populated with a current state for the update job and is populated with buttons for allowing each participant group to advance the project automatically to the next participant group, as described above.

Figure 12:
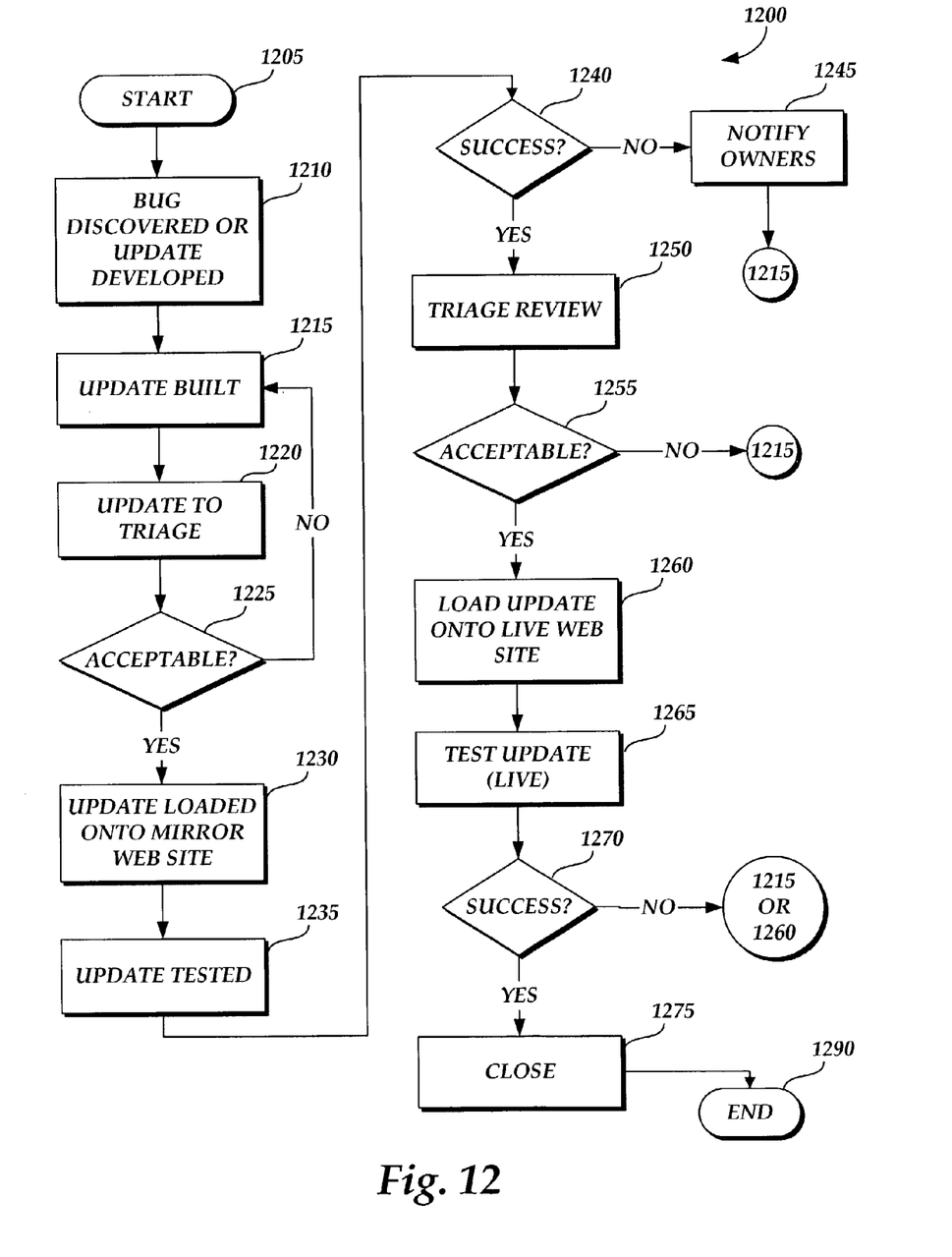
FIG. 12 is a flow diagram illustrating a routine for automating updates to and maintenance of a live Internet website according to an embodiment of the present invention.

FIG. 12 is a flow diagram illustrating a routine for automating updates to and maintenance of a live Internet website according to an embodiment of the present invention. The method 300 begins at start step 1205 and proceeds to step 1210 where an error (bug) is discovered in a live website, or where a useful update has been developed for improving or enhancing a live website. For example, a member of the consuming population of the live website may have called into the owner of the website to indicate that the website has a presentation problem such as misspelled words or grammatical errors, or that the website has functional problems such as buttons or other functionality that are not operating correctly. Alternatively, a developer of the presentation material or functionality of a live website 280 may develop an update for improving or enhancing the presentation or functionality of the live website. At step 1215, in response to the discovered error or based on the desired update, an update is built by the developer. At step 1220, the developer utilizing the web page 300 illustrated in FIG. 3 reports the update to the triage team for review of the update. Reporting between participants at each phase is performed via electronic mail transmission. Alternatively, the developer may submit the proposed update or fix to the triage team prior to actually building the update.

At step 1225, members of the triage team such as other developers, project managers, testers, lay consumers, and the like open the web page 300 and may review the proposed or built update and determine whether the update is acceptable. If the triage team does not find the update acceptable, the triage team may automatically disapprove of the update at which time the developer is electronically mailed to indicate that the update is not acceptable and will not be populated to the test website. The method proceeds back to step 1215 and the developer may build an additional update or modify the previous update.

If the triage team does find the update acceptable, the triage team may select the "triage approves" button 350, illustrated in FIG. 5, and the method proceeds to step 1230 where the proposed update is automatically uploaded to a mirror test website. Along with automatically uploading the update to the test site, a tester assigned to testing the proposed update is electronically mailed to notify the tester that testing of the test website should begin. When the tester opens the website 300, the website 300 job state 340 is changed to "testing" and the tester may then review and test the proposed update at step 1235. At step 1240, if the tester does not approve of the proposed update, the tester may select the "test does not approve" button 370, and at step 1245 an electronic mail notification may be sent to the job owners which are those persons and departments responsible for or otherwise associated with the live website and the update to the live website identified in field 315 of the website 300, illustrated in FIG. 3. If the owners of the website and updates thereto determine that the updates should be further pursued, the method may proceed back to step 1215 where additional updates may be built or the previous update may be modified.

If at step 1240, the tester selects the "test approves" button 365, the triage team is electronically mailed to notify the triage team that the tester has completed review of the proposed update on the test website, and the job state 340 changes to "triage (live)." At step 1250, the triage team opens the web page 300, illustrated in FIG. 5, and selects the test mirror website for review. At step 1255, if the triage team does not approve of the tested website, the method proceeds back to step 1215 and the update may be modified or additional updates may be built. If the triage team does find the tested mirror website acceptable, the method proceeds to step 1260, and the triage team selects the "triage approves" button 350 to automatically load the proposed and tested update onto the live website 280.

At step 1265, once the proposed update has been successfully loaded onto the live website 280, the tester is electronically mailed to notify the tester to test the update on the live website 280. When the tester opens the web page 300, illustrated in FIG. 10, the tester sees that the job state 340 has changed to "testing (live)." If the tester does not approve of the live website update, the method may proceed back to step 1215 for additional updates, or the method may proceed back to step 1260 to reload the update onto the live web site if an error was created in the first attempt to load the update onto the live website. If the tester does approve of the live website, the tester may select the "test approves" button 395, and the method proceeds to step 1275 where the update process is closed. If any member of the participating update team opens the website 300, after the process is closed, that member will see that the job state 340 has changed to "test approved (live)."

As should be appreciated, a fast track version of the described automated process may be implemented where a proposed update is only required for a minor error such as a spelling error or grammatical error affecting only the presentation of the live website. According to the foregoing, a proposed update is automatically forwarded to the next logical participating group for review and approval of the update before the update may progress to a next participating group. At any point during the process, any interested member of the participating group or any owner or management personnel having responsibility and access to the web page 300 may select the web page 300 to immediately obtain important information including the current job state, the identity of owners of the project, deployment issues, bugs or errors related to the job, and an actual copy of the proposed update may be obtained for review. Advantageously, the automated process keeps the update process on a definite track from update proposal to testing and approval of an ultimate live publication of the update and allows all participants and interested parties to have information related to the status of the update at any phase in the process.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of automating updates to Internet-based websites, comprising:

receiving a proposed update to an Internet-based website for review by a triage team via a website update automation web page, wherein the triage team comprises a plurality of participating groups, wherein, after the proposed update is received for review by a first participating group in the plurality of participating groups, automatically forwarding the proposed update to a next logical participating group in the plurality of participating groups to review the proposed update;

automatically uploading the proposed update to a test website for testing the proposed update;

electronically notifying a website tester to test a deployment of the proposed update to the test website;

automatically uploading the proposed update to a live website;

electronically notifying a website tester to test the deployment of the proposed update to the live website; and receiving at least one approval of the deployment of the proposed update to the live website, wherein the proposed update is received, uploaded to the live website, and uploaded to the test website only for at least one of a spelling error and a grammatical error which affects only the presentation of the live website, wherein at any point during the step of automatically forwarding the proposed update to a next logical participating group in the plurality of participating groups, current job state information, project owner identity information, deployment issue information, the at least one of a spelling error and a grammatical error, and an actual copy of the proposed update are immediately obtained for review by a member of any of the plurality of participating groups upon selecting the website update automation web page.

2. The method of claim 1, whereby the proposed update to the Internet-based website includes updates to the presentation of data on the Internet-based website.

3. The method of claim 1, whereby the proposed update to the Internet-based website includes updates to functionality provided by the Internet-based website.

4. The method of claim 1, wherein receiving the proposed update by the triage team via the website update automation web page comprises receiving a link to a computer file containing the proposed update on a website update automation web page.

5. The method of claim 1, if the website tester approves the proposed update, electronically notifying the triage team to review the test website.

6. The method of claim 1, prior to automatically uploading the proposed update to a live website, populating the website update automation web page with a triage approval/disapproval function, the triage approval/disapproval function comprising an approval button displayed in a graphical user interface on the website update automation web page.

7. The method of claim 1, whereby if the triage team does not approve the deployment of the proposed update to the test website, electronically notifying the developer of the proposed update that the proposed update is not acceptable.

8. The method of claim 1 further comprising, electronically notifying the website tester to test the live website deployment of the proposed update.

9. The method of claim 4, further comprising populating the website update automation web page with a triage approval/disapproval function, wherein the triage approval/disapproval function comprises an approval button displayed in a graphical user interface on the website update automation web page.

10. The method of claim 5, whereby if the website tester does not approve of the deployment of the proposed update to the test website, electronically notifying a developer of the proposed update that the proposed update is not acceptable.

11. The method of claim 5, prior to electronically notifying the triage team to review the test website, receiving the selection of a test approval function on the website update automation web page.

12. The method of claim 6, further comprising receiving a selection of the triage approval function to automatically upload the proposed update to the live website.

13. The method of claim 8, after notifying the website tester to test the deployment of the proposed update for the live website, populating the website update automation web page with test approval/disapproval function buttons in a graphical user interface.

14. The method of claim 9, further comprising populating the website update automation page with a test approval/disapproval buttons in a graphical user interface.

15. The method of claim 13, further comprising receiving a selection of the test approval function.

16. The method of claim 15, whereby upon receiving a selection of the test approval function if the website tester approves the deployment of the proposed update to the live website, updating a job state shown on the website update automation web page to indicate that the test of the live website is approved.

17. A computer readable medium containing computer executable instructions which when executed by a computer perform a method of automating updates to Internet-based websites, the method comprising:

populating a proposed update to an Internet-based website onto a website update automation web page;

electronically notifying a triage team to review the proposed update, wherein the triage team comprises a plurality of participating groups, wherein, after the proposed update is received for review by a first participating group in the plurality of participating groups, automatically forwarding the proposed update to a next logical participating group in the plurality of participating groups to review the proposed update;

receiving approval or disapproval commands from the triage team after the triage team reviews the proposed update via the website update automation web page;

automatically uploading the proposed update to a test website for testing the proposed update;

electronically notifying a website tester to test the proposed update;

receiving approval or disapproval commands for the website tester after the website tester tests a deployment of the proposed update to the test website;

electronically notifying the triage team to review the deployment of the proposed update to the test website;

receiving at least one of an approval command and a disapproval command from the triage team after the triage team reviews the proposed update via the website update automation web page;

automatically uploading the proposed update to a live website;

electronically notifying a website tester to test the proposed update; and receiving at least one of an approval command and a disapproval command for the website tester after the website tester tests the deployment of the proposed update to the test website, wherein the proposed update is received, uploaded to the live website, and uploaded to the test website only for at least one of a spelling error and a grammatical error which affects only the presentation of the live website, wherein at any point during the step of automatically forwarding the proposed update to a next logical participating group in the plurality of participating groups current job state information project owner identity information deployment issue information the at least one of a spelling error and a grammatical error, and an actual copy of the proposed update are immediately obtained for review by a member of any of the plurality of participating groups upon selecting the website update automation web page.

18. The computer readable medium of claim 17, after populating a proposed update to an Internet-based website onto a website update automation web page, receiving a computer readable file containing the proposed update to the Internet-based website.

19. A method of automating updates to Internet-based websites, comprising:
- populating a proposed update to an Internet-based website onto a website update automation web page;
- electronically notifying a triage team to review the proposed update, wherein the triage team comprises a plurality of participating groups, wherein, after the proposed update is received for review by a first participating group in the plurality of participating groups, automatically forwarding the proposed update to a next logical participating group in the plurality of participating groups to review the proposed update;
- receiving approval or disapproval commands from the triage team after the triage team reviews the proposed update via the website update automation web page;
- automatically uploading the proposed update to a test website for testing the proposed update;
- electronically notifying a website tester to test the proposed update;
- receiving approval or disapproval commands via displayed buttons in a graphical user interface for the website tester after the website tester tests a deployment of the proposed update to the test website;
- electronically notifying the triage team to review the deployment of the proposed update to the test website;
- receiving approval or disapproval commands from the triage team via displayed buttons in a graphical user interface after the triage team reviews the proposed update via the website update automation web page;
- automatically uploading the proposed update to a live website;
- electronically notifying a website tester to test the proposed update; and
- receiving at least one of an approval command and a disapproval command in the graphical user interface for the website tester after the website tester tests the deployment of the proposed update to the test website, wherein the proposed update is received, uploaded to the live website, and uploaded to the test website only for at least one of a spelling error and a grammatical error which affects only the presentation of the live website, wherein at any point during the step of automatically forwarding the proposed update to a next logical participating group in the plurality of participating groups current job state information project owner identity information deployment issue information the at least one of a spelling error and a grammatical error, and an actual copy of the proposed update are immediately obtained for review by a member of any of the plurality of participating groups upon selecting the website update automation web page.

* * * * *